Aug. 7, 1962  J. B. CATALDO ETAL  3,048,672
SAFETY BUS DUCT PLUG
Filed Nov. 9, 1959  14 Sheets-Sheet 1
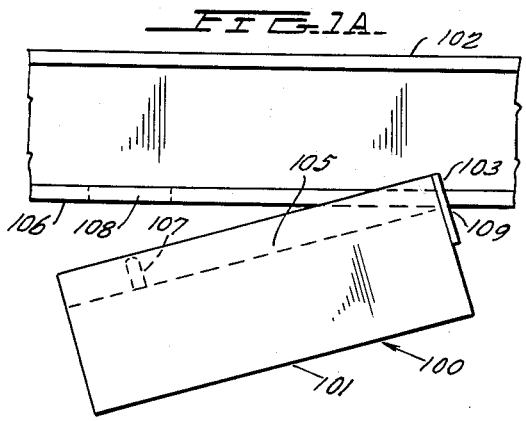
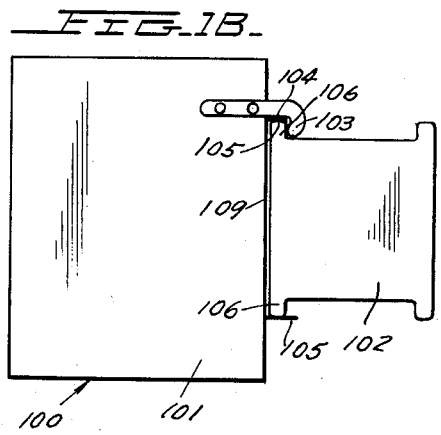
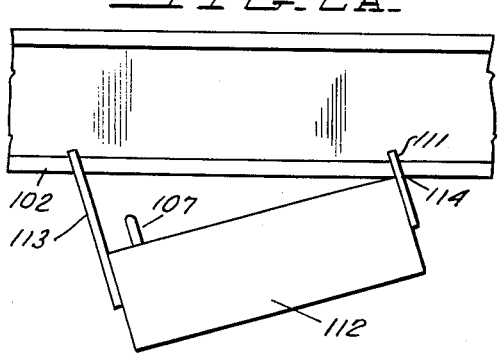
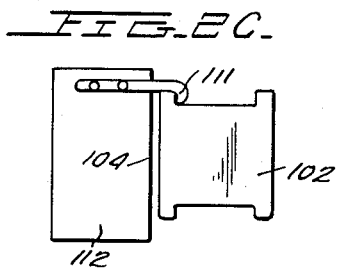
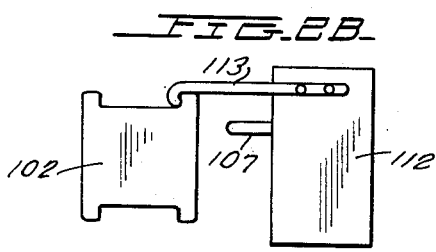
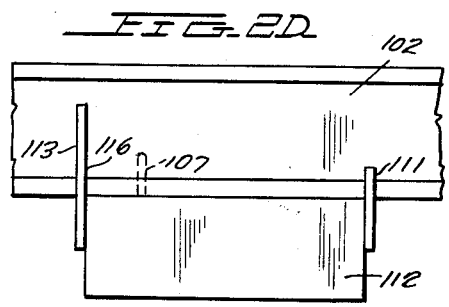
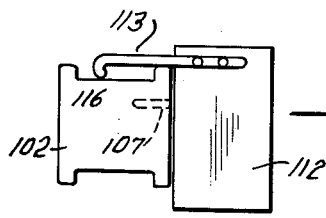
INVENTORS
JOHN B. CATALDO
ROBERT W. THOMAS
BY MICHAEL L. MEAD
NORMAN SHACKMAN
Ostrolenk Faber,
Gerb & Soffen
ATTORNEYS

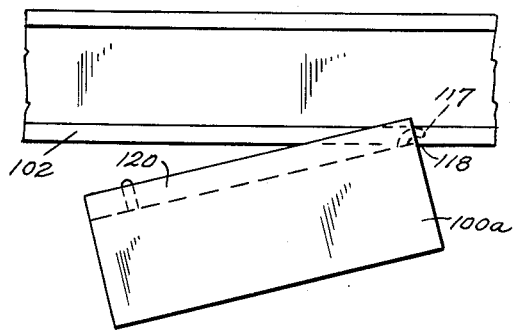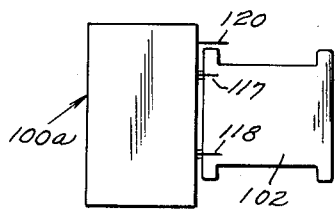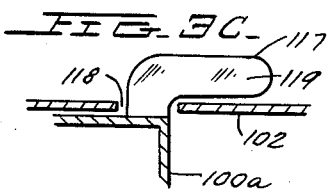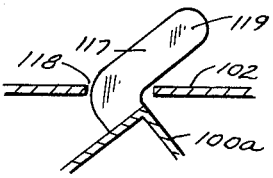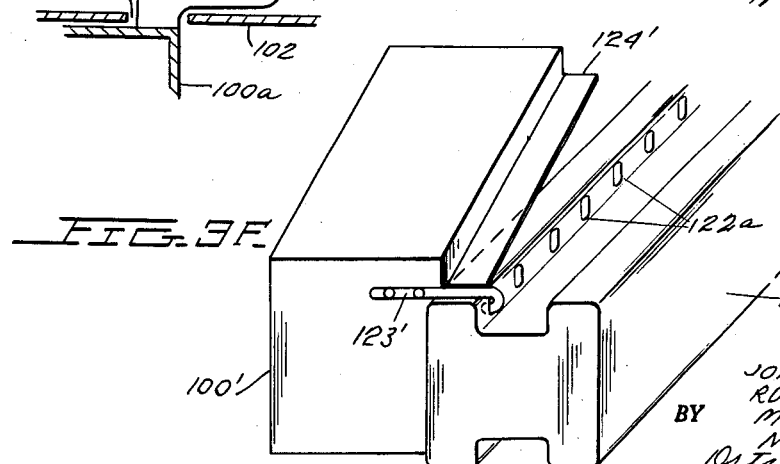

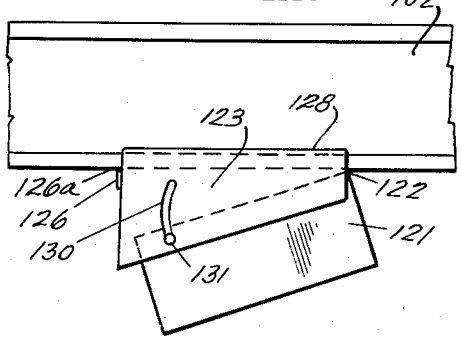
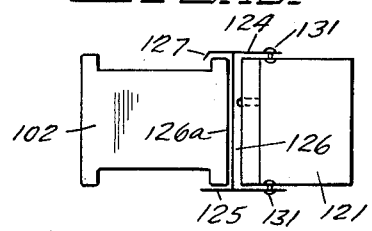
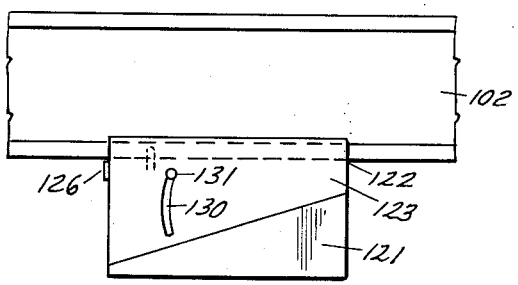
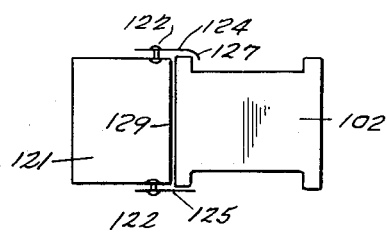
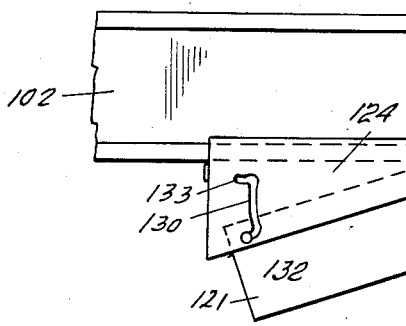
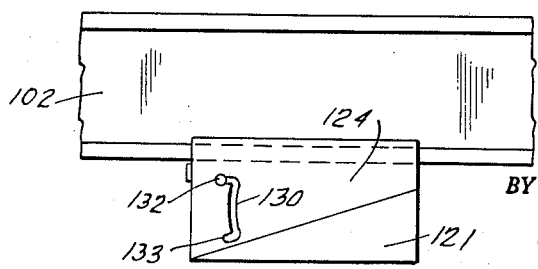

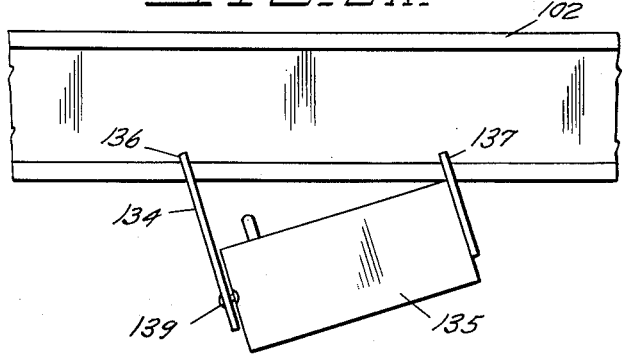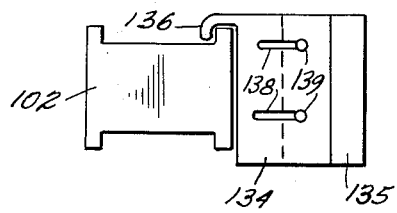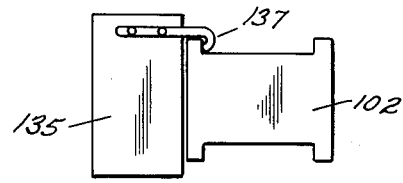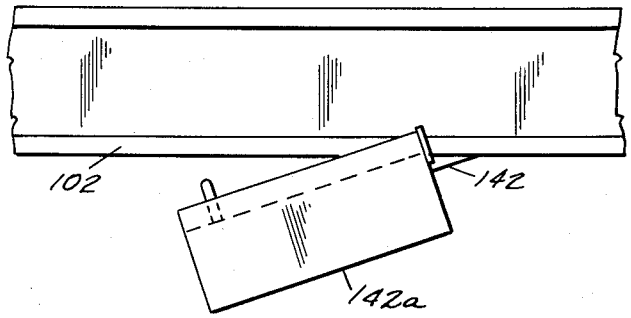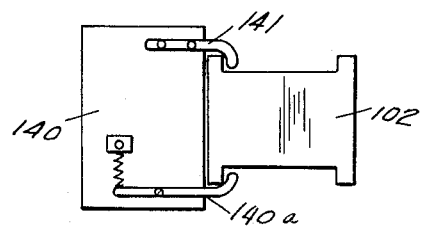

Aug. 7, 1962   J. B. CATALDO ETAL   3,048,672
SAFETY BUS DUCT PLUG
Filed Nov. 9, 1959   14 Sheets-Sheet 5
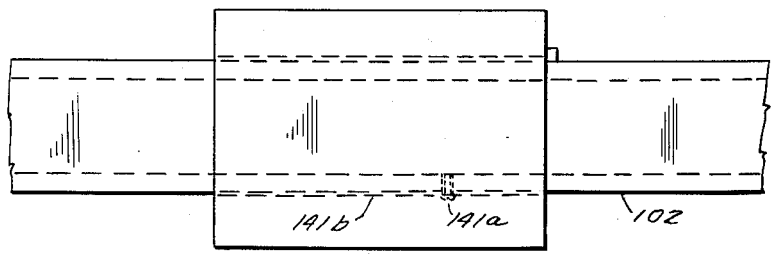
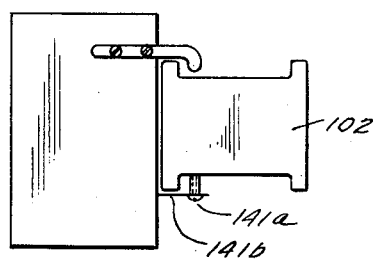   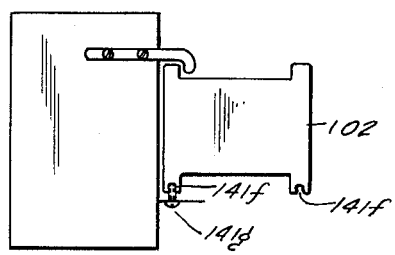
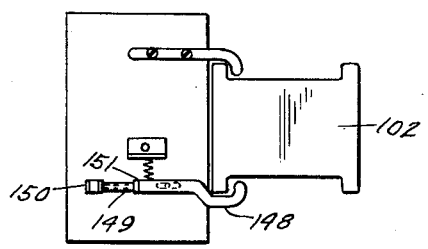   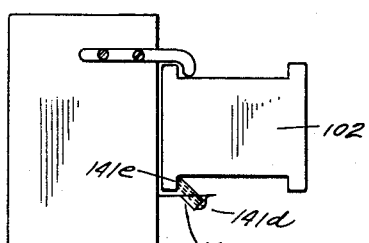
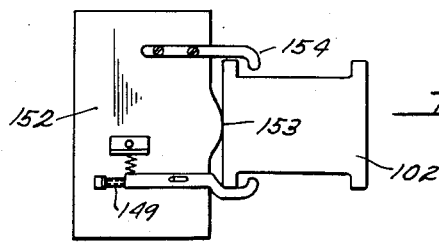
INVENTORS
JOHN B. CATALDO
ROBERT W. THOMAS
MICHAEL L. MEAD
NORMAN SHACKMAN
BY Ostrolenk, Faber,
Gerb & Soffen
ATTORNEYS

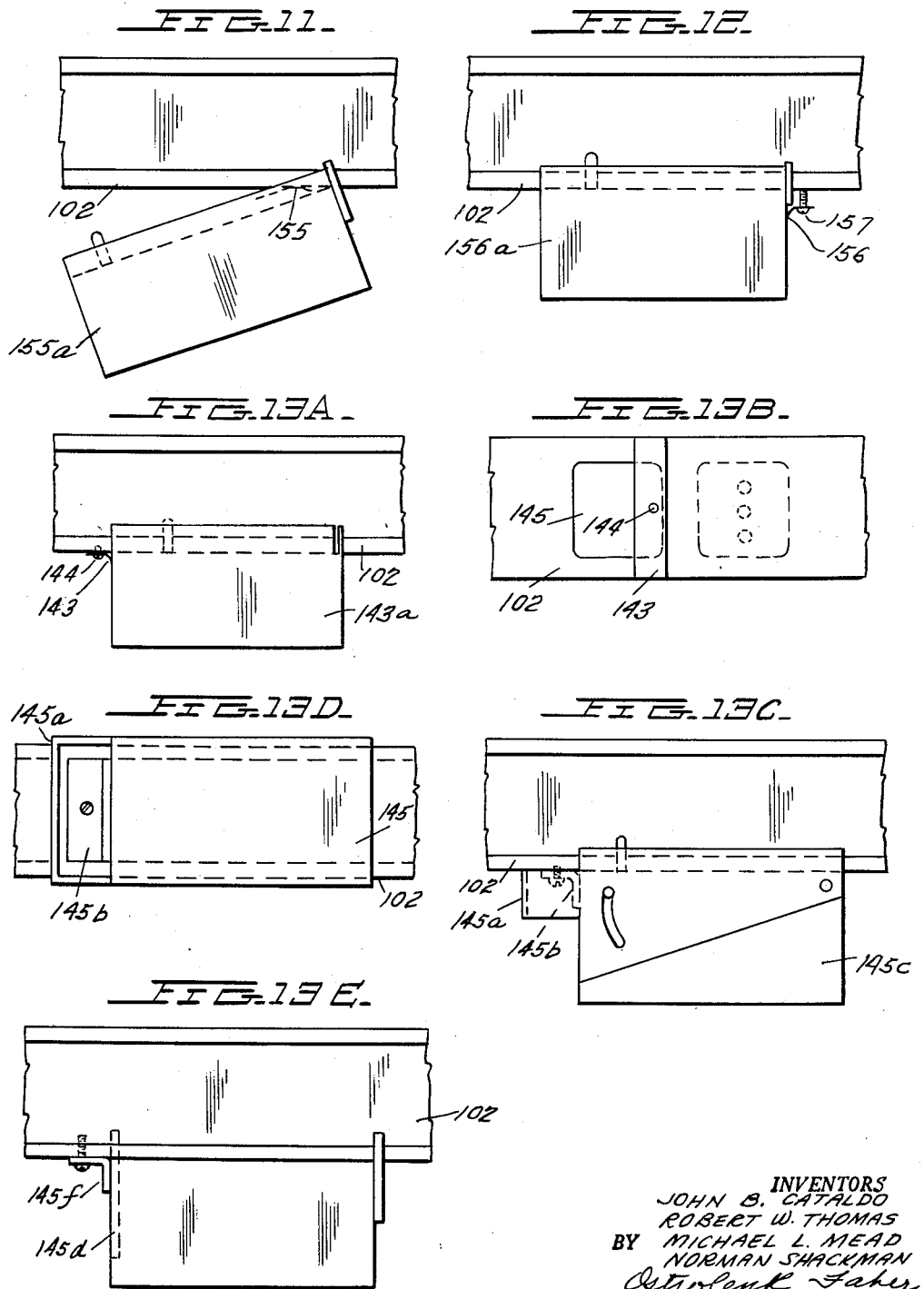

Aug. 7, 1962  J. B. CATALDO ET AL  3,048,672
SAFETY BUS DUCT PLUG
Filed Nov. 9, 1959  14 Sheets-Sheet 7

INVENTORS
JOHN B. CATALDO
ROBERT W. THOMAS
MICHAEL L. MEAD
NORMAN SHACKMAN
BY
ATTORNEYS

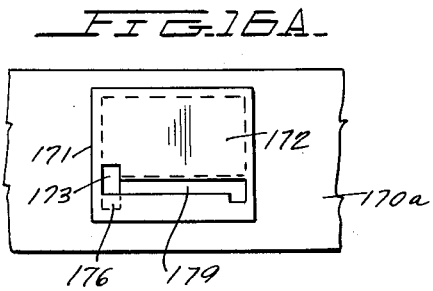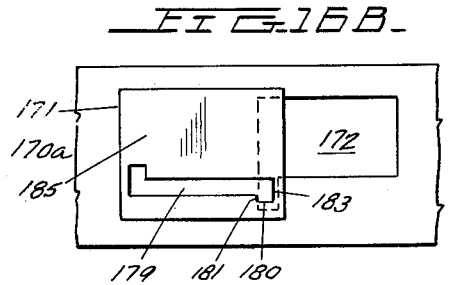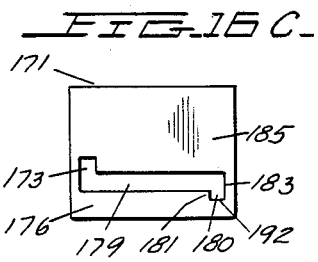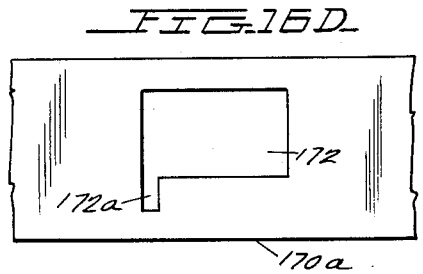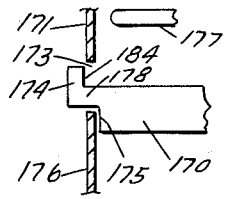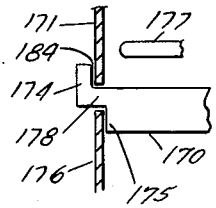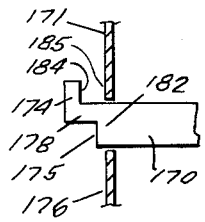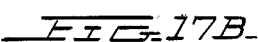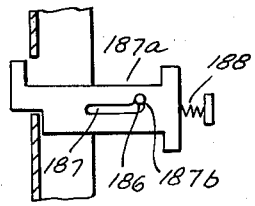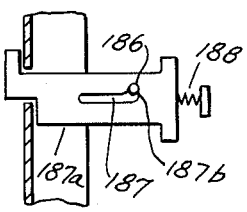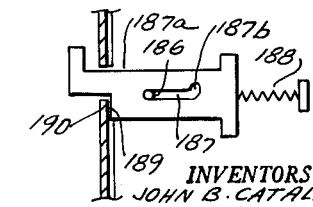

Aug. 7, 1962 J. B. CATALDO ETAL 3,048,672
SAFETY BUS DUCT PLUG
Filed Nov. 9, 1959 14 Sheets-Sheet 9
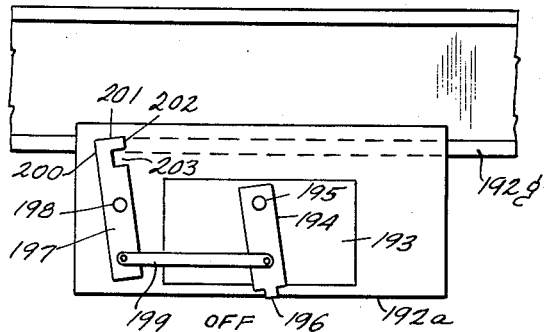
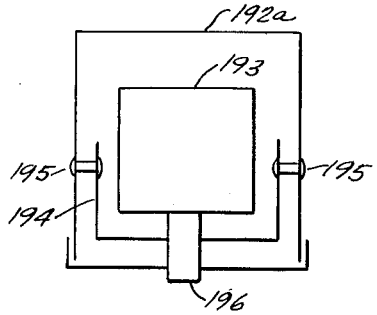
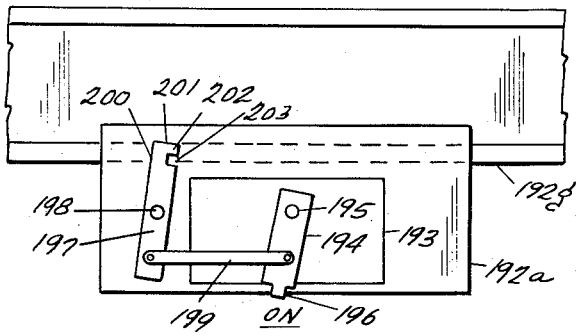
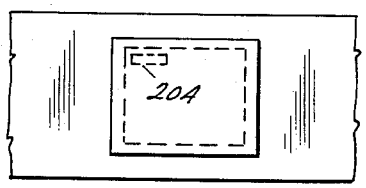
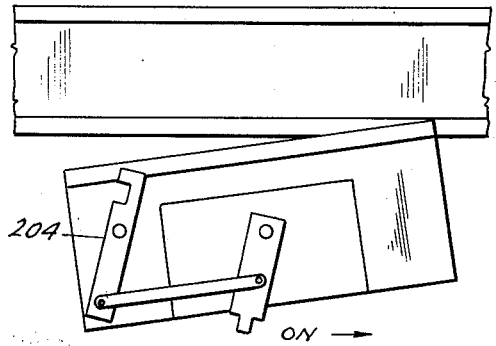
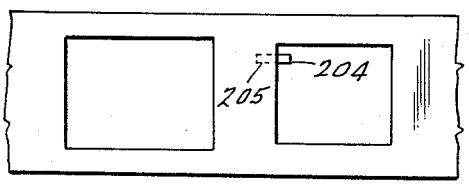
INVENTORS
JOHN B. CATALDO
ROBERT W. THOMAS
BY MICHAEL L. MEAD
NORMAN SHACKMAN
Ostrolenk, Faber,
Gerb & Soffen
ATTORNEYS Aug. 7, 1962 J. B. CATALDO ETAL 3,048,672
SAFETY BUS DUCT PLUG
Filed Nov. 9, 1959 14 Sheets-Sheet 10
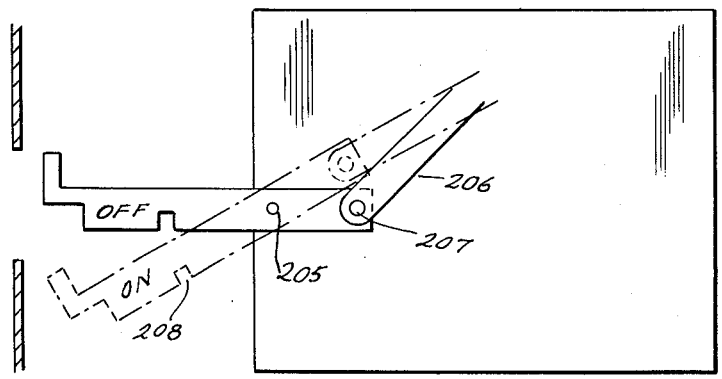
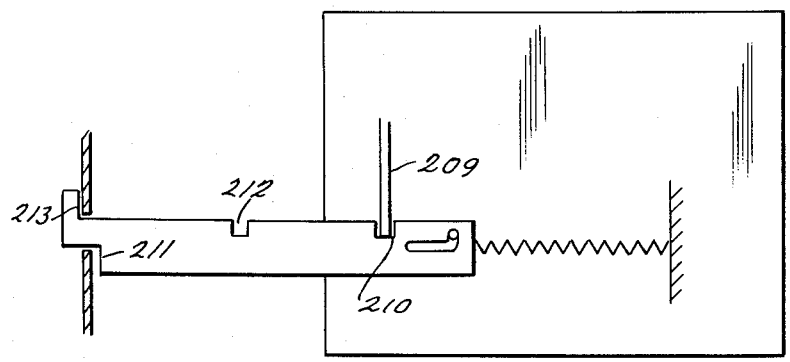
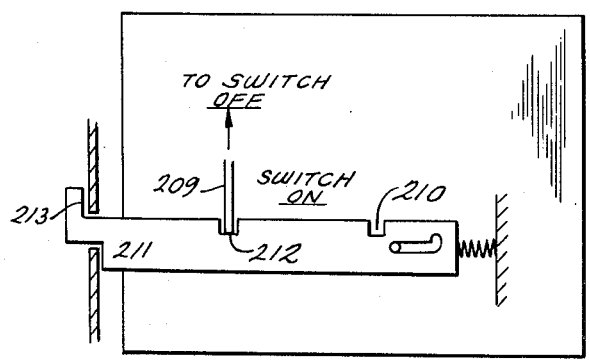
INVENTORS
JOHN B. CATALDO
ROBERT W. THOMAS
MICHAEL L. MEAD
NORMAN SHACKMAN
BY Ostrolenk, Faber,
Gerb & Soffen
ATTORNEYS Aug. 7, 1962   J. B. CATALDO ETAL   3,048,672
SAFETY BUS DUCT PLUG
Filed Nov. 9, 1959   14 Sheets-Sheet 11
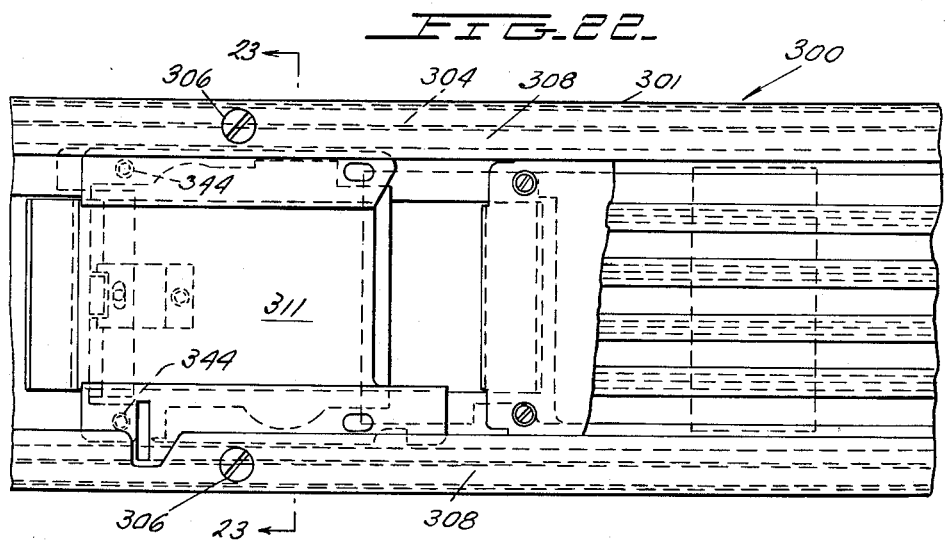
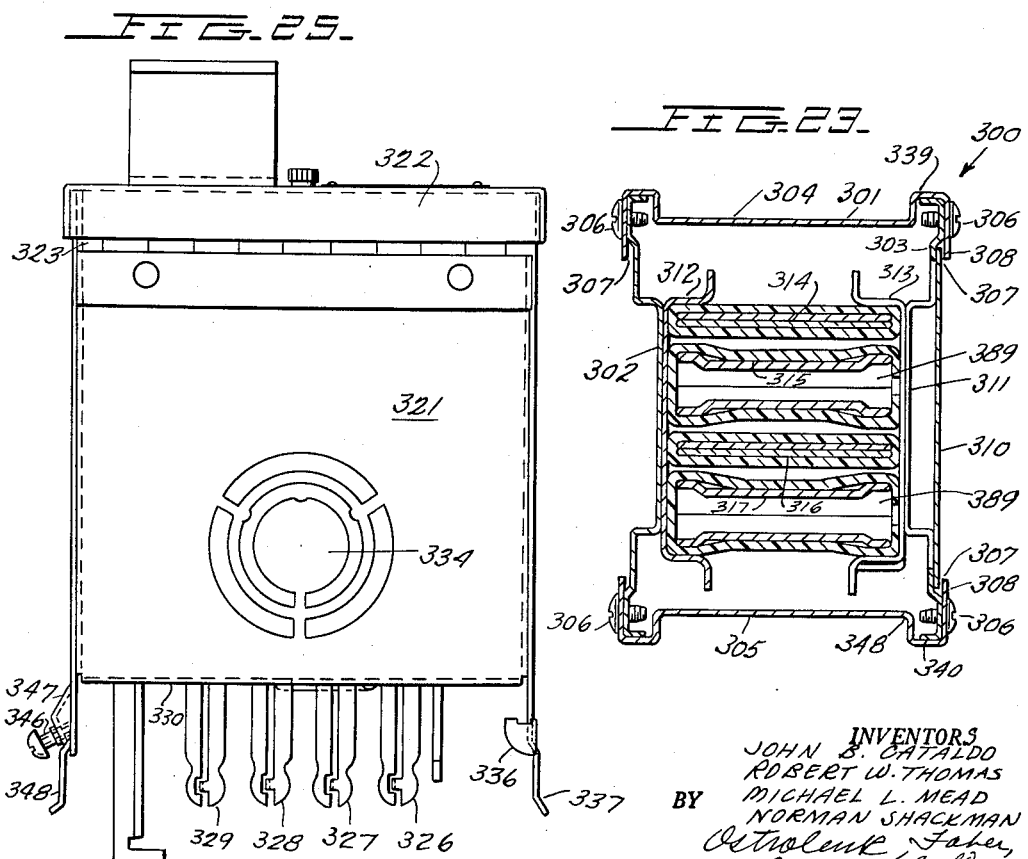
INVENTORS
JOHN B. CATALDO
ROBERT W. THOMAS
MICHAEL L. MEAD
NORMAN SHACKMAN
BY Ostrolenk, Faber,
Gerb & Soffen
ATTORNEYS

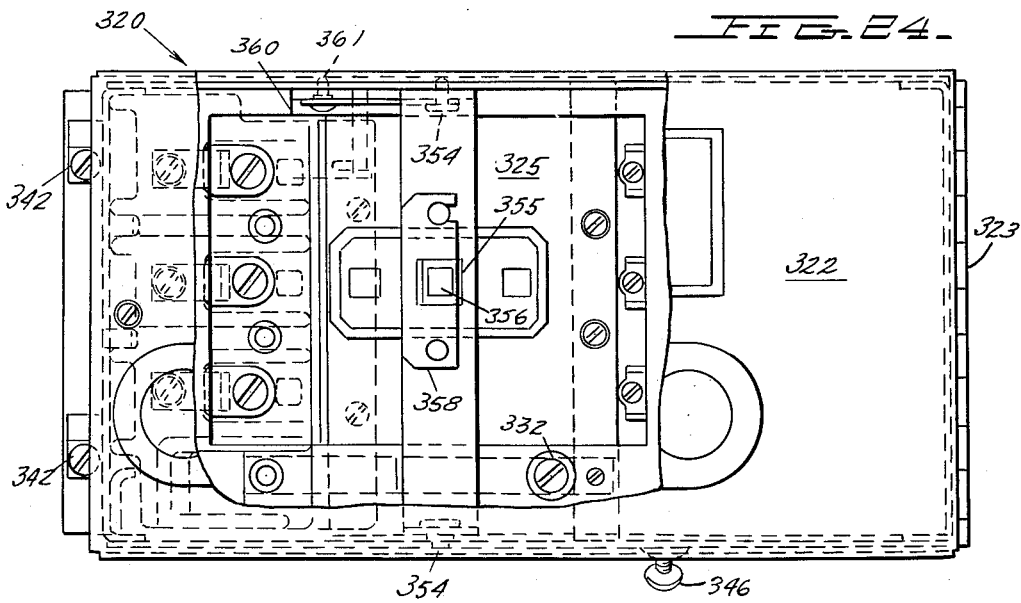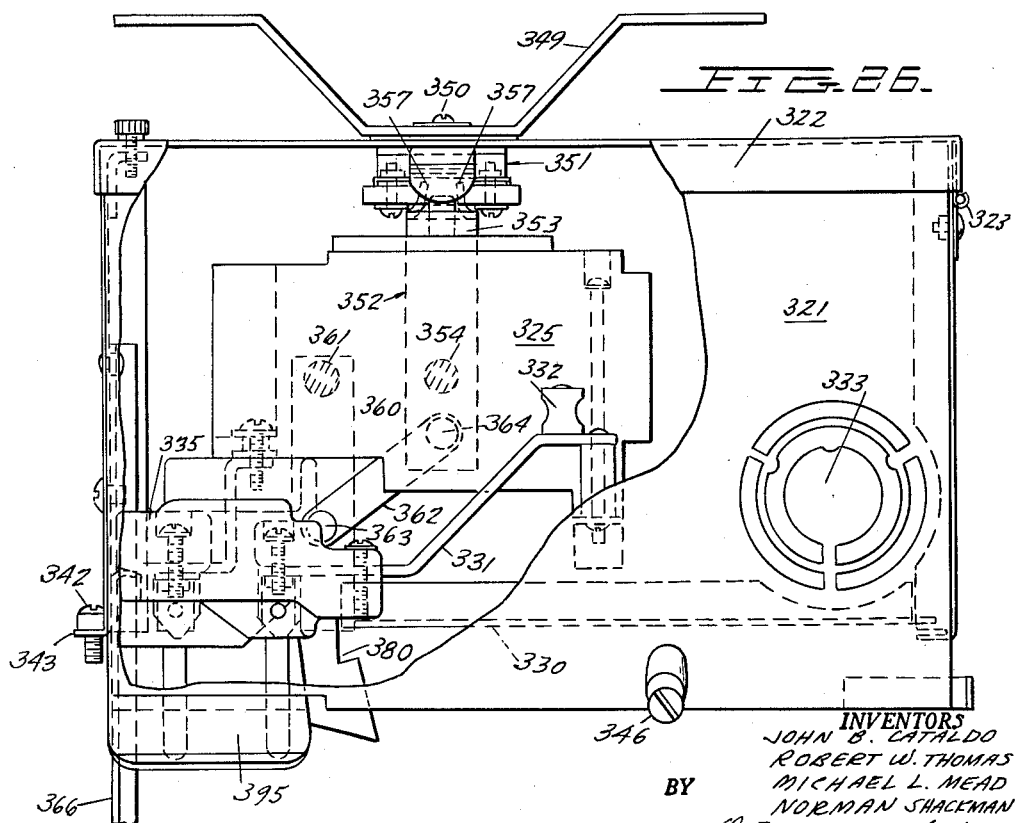

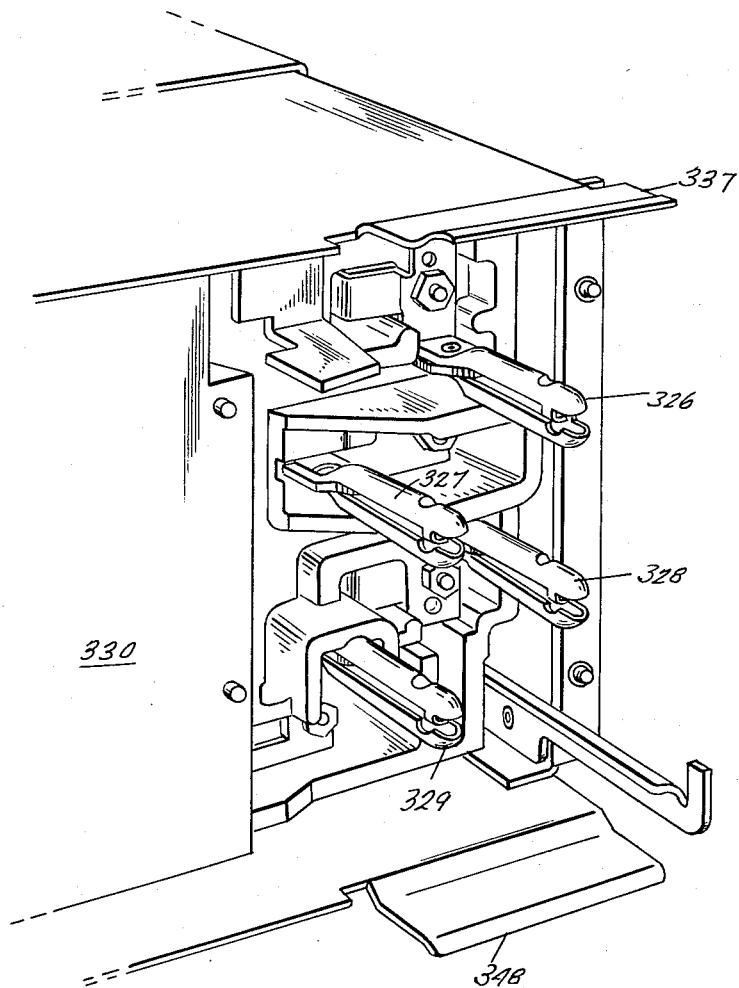

Aug. 7, 1962    J. B. CATALDO ETAL    3,048,672
SAFETY BUS DUCT PLUG
Filed Nov. 9, 1959    14 Sheets-Sheet 14
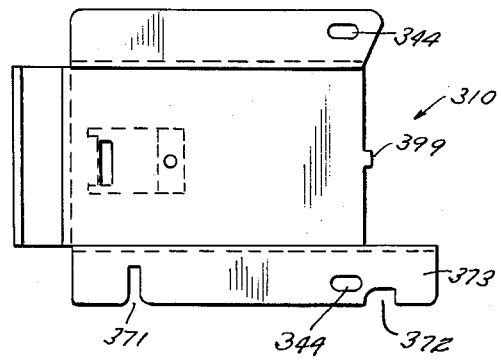
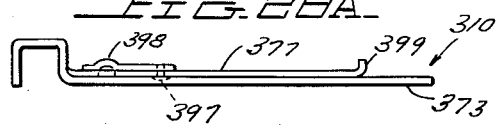
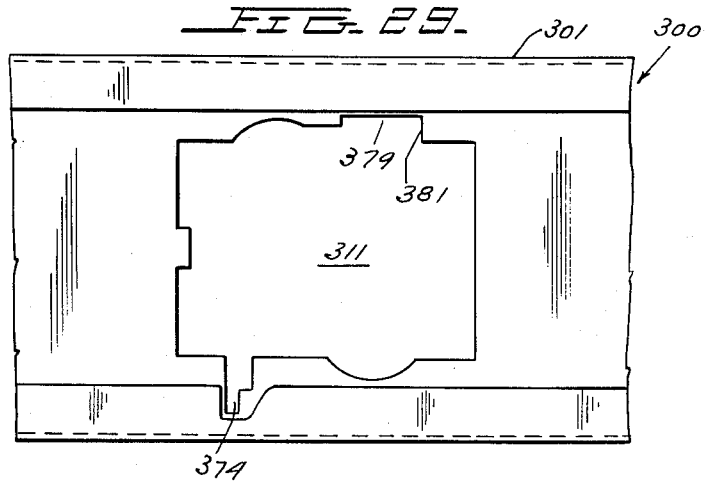
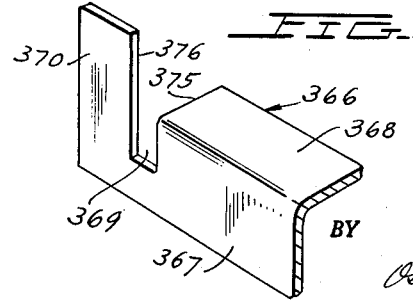
INVENTORS
JOHN B. CATALDO
ROBERT W. THOMAS
MICHAEL L. MEAD
NORMAN SHACKMAN
BY
Ostrolenk, Faber,
Gerb & Soffen
ATTORNEYS – # United States Patent Office 3,048,672
Patented Aug. 7, 1962

3,048,672
SAFETY BUS DUCT PLUG
John B. Cataldo, Birmingham, Robert W. Thomas, St. Clair Shores, Michael L. Mead, Detroit, and Norman Shackman, Oak Park, Mich., assignors to I-T-E Circuit Breaker Company, Philadelphia, Pa., a corporation of Pennsylvania
Filed Nov. 9, 1959, Ser. No. 851,776
16 Claims. (Cl. 200—50)

The instant invention relates to bus duct electric distribution systems in general and more particularly to a novel construction whereby the hazards of plug installation and removal are substantially eliminated.

Bus duct as an electric distribution system includes as one of its prime functions, an ability to provide areas along its length whereby devices can be inserted or plugged in for tapping off power to specific loads. These areas constitute cut-away portions of the duct enclosure over which a door is placed to close the area when a plug is not in position. While there has been no historic question regarding the effectiveness of a plug-in bus duct system for supplying power to individual loads, there have been many instances which attest to the lack of safety inherent in the installation procedures required for many types of plugs. Accidental contact by a metallic object or tool between energized bus bars, or between a bus bar and the duct enclosure has resulted in electrical flashovers which have damaged equipment and created injuries to personnel. The probability for such accidents can be shown to be relatively high when the required installation sequence is examined closely.

The usual action that is first taken in installing a plug device of the prior art is to open the door over the plug-in area. Many doors require the engagement of a hand tool for this purpose. Slippage of such a tool into the plug-in area has caused many electrical shocks and power arcs when the tool accidentally contacted a bus bar. Greatly increasing the probability of such an occurrence is the fact that the installer is holding a relatively heavy plug in one hand while attempting to open the plug-in access door with the other hand, meanwhile balancing itself on a tall ladder.

After the door has been opened, the plug must be aligned properly with the plug-in opening and then pushed into position so that the finger contacts engage the bus bars. The installer must balance or hold the plug against the duct with one hand, while trying to insert fastening screws, or to otherwise place a fastening means into position with the other hand. During these actions, there have been instances of damage to finger contacts from improper alignment, dropping of the plugs because of insufficient temporary support, dropping of fastening elements, such as screws, when attempting to install them with one hand, and a variety of other nuisance troubles which greatly increase installation time and contribute to the improper functioning of plugs.

In addition to these mechanical problems, there have been instances of electrical failures from shocks and power arcs when attempting to insert the plugs with internal switching contacts in the On position and a load connected. This occurrence is quite prevalent when plugs are pre-wired, or when plugs are changed from one location to another. In such instances, an arc is formed as the finger contacts engage the bus bars. Such arcing can cause a power arc to start by the accumulation of ionized gases within the confines of the plug-in area.

A third problem associated with the use of plugs in prior art plug-in bus duct has to do with removal of plugs from the duct. The mechanical actions regarding removal of fastening means, lack of support, etc. are similar to those described previously, although in reverse, and create similar hazards. In addition, there is the electrical hazard of starting a power arc if the plug is removed while the switching contacts are in the On position and a load is still connected. The load is broken by disengaging the finger contacts from the bus bars. The ionized gases that result can cause power arcs as previously described. Hazards to personnel from such arcs are greater during removal of the plug than when inserting the plug. In the latter case, inserting the plug results in a partial block of the plug-in opening so that any electrical flash is screened somewhat from the face, hands, and body of the installer. This is not true when a plug is removed under a connected load condition and the plug-in area may be completely open.

Once a plug has been removed, the door is not infrequently left open for reasons of lack of time, jamming of the door, and a variety of other causes. The same possibility of tool insertion exists as previously mentioned. In this case, however, it is not only for the installer that this hazard exists, but for any other personnel or cause not associated with actively inserting a plug such as traveling canes, equipment, material, etc. Finally, the hazard of leaving plug-in doors to open also extends to the undesirable entrance and accumulation of dust and other foreign matter within the bus duct.

The prior art has attempted to solve the above noted problems by providing plug devices in which the contact fingers are part of an assembly within the plug case which can be made to extend or retract the fingers into and out of engagement with the duct bus bars. This assembly required a complicated operating mechanism which too often failed in view of the fact that it was infrequently used.

In contrast the instant invention solves the above noted problem by utilizing a simplified construction enabling the plug unit to have contact fingers which are stationary with respect to the plug case. This is accomplished by providing the duct and plug of the instant invention with the following features either alone or in combination:

(1) Temporary support means,
(2) Plug-in opening alignment,
(3) Final fastening means,
(4) Interlock for duct doors and
(5) Load break switch interlock means.

The temporary support means comprises a hook whereby a plug unit can be self-supported in an intermediate postion by the enclosure of a bus duct section from which, after other functions are accomplished, the unit may be moved into or out of its final inserted position. Such temporary support permits support of the plug-in unit on the duct at a position other than its final position; permits alignment of plug contact fingers and other associated parts for final positioning without any manual support of the unit; makes it possible to wire the plug-in safely in its intermediate position before the contact fingers engage the bus duct conductors; reduces the probability of accidental contact with the conductors of the bus duct by a tool or other metallic object by partially covering the plug-in area with the body of the plug-in device when the plug-in access door is moved; creates a safer means for engaging and disengaging the plug contact fingers with the bus bars by allowing freedom in the use of both hands of the installer for this function; and permits the plug-in access door to be safely opened or closed with the plug in a self-supporting intermediate position.

The plug in opening alignment means comprises formations in the bus enclosure which cooperate with temporary support means hook to position the plug so that upon final positioning of the plug its contact fingers will always extend through the access opening in the duct housing without striking the duct housing.

The final fastening means comprise screw means which engages cooperating thread openings of the duct housing and may also include screw means which bears against the duct housing at strategic points whereby the contact fingers are maintained in engagement with the bus bars and the plug is firmly secured to the duct.

The interlock for the duct doors comprises means by which a cooperative member or members are provided between a plug-in unit and a plug-in access door on the bus duct so that the door may be opened or closed only when the plug-in unit is in an intermediate position. For unusual instances of inspection, emergency, or use of non-standard plug devices, both the interlock member and/or door can be moved to another position to obtain voidable action. Thus, the plug-in access doors are kept closed when a plug-in unit is not in an inserted position; hence, exposure of bus bars for accidental short circuit contact with a metallic object, and entrance of dust, dirt, etc., is eliminated; exposure of bus bars for accidental short circuit contact with a metallic object during installation of plug is virtually eliminated since the plug unit blocks the opening during the sequence of engagement of interlock with the door and door opening; there is assurance that a plug access door is closed during the initial phase of plug installation since engagement of the interlock member can only be made with the door closed; accidental short circuit contact between the door and plug unit fingers when the plug is in its full engaged position is eliminated (that is, the door can be closed) by an interference between the door and interlock member; a safer plug retraction sequence is obtained since a stop is provided between the interlock member and the door when the plug is being retracted. This stop provides a temporary and partial support of the plug device; and complete safety from bus bar exposure when a plug is removed from the duct is obtained since the plug-in access door must be closed before the plug can be completely removed from the duct.

Load break switch interlock is achieved by an interaction of a member from the plug with the duct enclosure whereby the contact fingers of the plug are prevented from engaging or disengaging the duct bus bars if the plug switching contacts are in the closed position. Such an interaction can be made voidable. During insertion of a plug into bus duct, accidental energization of a plug load by contact between fingers and the duct bus bars is eliminated; during the act of removing a plug from bus duct, accidental breaking of a plug load between fingers and the duct bus bars is eliminated; and safety of personnel and elimination of damage to equipment from power arcs started between finger contacts and bus bars is obtained.

Accordingly, a primary object of the instant invention is to provide a novel construction for a bus duct plug unit including temporary support means whereby the plug is supported in an intermediate mounting position and thereafter pivoted into final mounting position.

Another object of this invention is to provide novel means including the temporary support means for bringing the plug unit contact fingers in alignment with an access opening of the duct.

Still another object of this invention is to provide novel means for maintaining a plug unit in its final mounting position with respect to the duct.

A further object is to provide novel means for interlocking the duct access doors responsive to the position of the plug unit relative to the duct.

A still further object is to provide novel means for interlocking the load break switch responsive to the position of the plug unit relative to the duct.

These as well as other objects of the instant invention shall readily become apparent after reading the following description of the accompanying drawings in which:

FIGURE 1A is a plan view of a plug mounted to a duct in an intermediate position.

FIGURE 1B is a load end view of the duct and plug of FIGURE 1A with the plug in final fastening position.

FIGURE 2A is a plan view of a modification of the plug illustrated in FIGURE 1A.

FIGURES 2B and 2C are end views of the duct and plug of FIGURE 2A looking at the line and load ends, respectively.

FIGURE 2D is a plan view of the plug and duct of FIGURE 2A with the plug in final position.

FIGURE 2E is a line end view of the plug of FIGURE 2D.

FIGURE 3A is a plan view of a plug mounted to a duct in a temporary position with the plug utilizing side hooks as a temporary fastening means.

FIGURE 3B is a load end view of the plug and duct of FIGURE 3A.

FIGURES 3C and 3D are cross-sections illustrating in detail the hook arrangement of FIGURE 3A.

FIGURE 3E is a perspective view of a plug mounted in a temporary position to a duct with the duct including slots for locating a plug.

FIGURE 3F is a perspective similar to FIGURE 3E wherein the duct includes embossments for locating the plug.

FIGURE 4A is a plan view of a plug mounted to a duct in an intermediate position with the plug including a two piece construction for effecting temporary fastening.

FIGURES 4B and 4C are end views of FIGURE 4A looking at the line and load ends, respectively, of the plug.

FIGURE 4D is a plan view of the plug and duct of FIGURE 4A with the plug in final position.

FIGURES 4E and 4F are plan views of a modified construction of the plug illustrated in FIGURE 4A. In FIGURE 4E the plug is mounted to the duct in the intermediate position and in FIGURE 4F the plug is in final position.

FIGURES 5A–5C are plan and end views of a load and a line end, respectively, of a plug and duct construction which is a modification of the construction illustrated in FIGURE 4A.

FIGURE 6 is a load end view of a plug mounted to a duct with the plug including two hooks for temporary fastening.

FIGURE 7 is a plan view illustrating an embodiment wherein a simple bracket is utilized to limit the extent to which the plug may pivot away from the duct.

FIGURE 8A is a plan view and FIGURES 8B–8D are load end views illustrating various embodiments for final fastening of the plug to the duct. All of these embodiments utilize a simple screw means.

FIGURE 9 is a modification of the embodiments illustrated in FIGURES 8A–8D.

FIGURE 10 is a line end view illustrating a modification of the embodiment of FIGURE 9.

FIGURES 11 and 12 are plan views of a plug mounted to a duct. These figures illustrate an embodiment for final fastening on the load end of the plug whereby slack between plug and duct is eliminated.

FIGURES 13A–13E illustrate various embodiments for final fastening at the line end of the plug. FIGURES 13A, 13C and 13E are plan views of a plug mounted to the duct of FIGURES 13B and 13D which are side views of the duct.

Figure 14A:
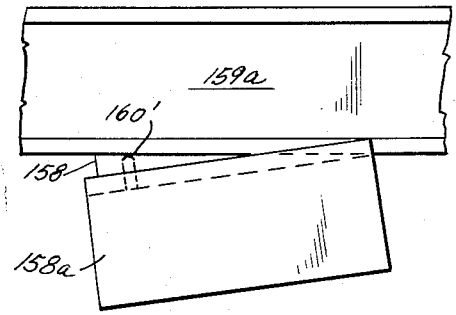
Figure 14B:
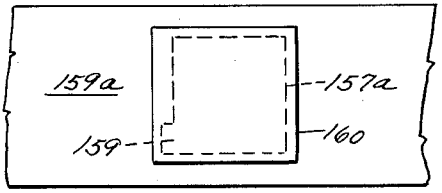
Figure 14D:
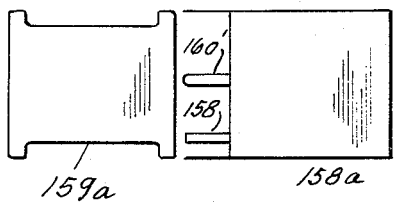
Figure 14C:
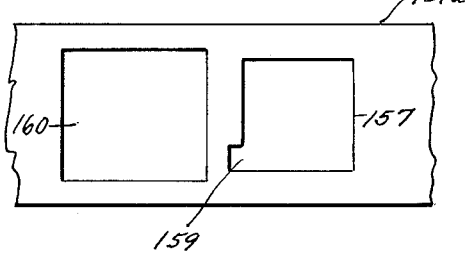
Figure 14E:
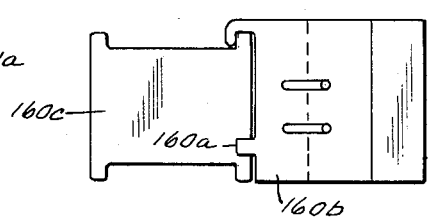

FIGURES 14A–14E illustrate a door interlock arrangement. FIGURE 14A is a plan view of the plug mounted in intermediate position to the duct, FIGURES 14D and 14E are line end views, while FIGURES 14B and 14C are elevational views of the duct. In FIGURE 14B the access door is closed and in FIGURE 14C the access door is opened.

Figure 15A:
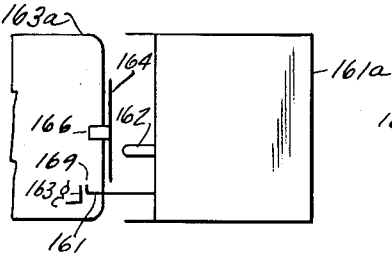
Figure 15B:
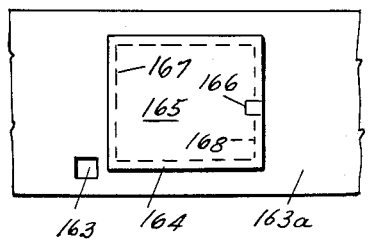
Figure 15C:
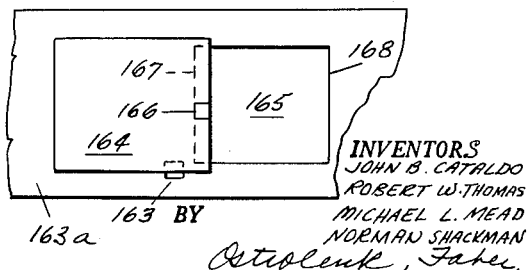

FIGURES 15A–15C illustrate another embodiment of a door interlock means. FIGURE 15A is a line end view while FIGURES 15B and 15C are elevational views. In FIGURE 15B the access door is closed while in FIGURE 15C the access door is opened.

FIGURES 16A–16D illustrate another embodiment of a door interlock means.

FIGURES 16E–16G illustrate the relative positions between the plug door interlock finger and the Z-shaped slot of the door for various positions of the door.

FIGURES 17A–17C are similar to FIGURES 16C–16G and illustrate a modified door interlock construction.

FIGURES 18A–18C illustrate an interlock arrangement between a load break switch and the door of the duct. FIGURES 18A and 18B are plan views of the plug mounted to the duct while FIGURE 18C is an end view of the plug. In FIGURE 18A the load break switch is in the Off position while in FIGURE 18C the load break switch is in the On position.

FIGURES 19A–19C illustrate a modified construction for a switch interlock. FIGURE 19A is a plan view of a plug mounted in intermediate position to a duct while FIGURES 19B and 19C are elevational views of the duct of FIGURE 19A.

FIGURE 20 is a line end view of a plug illustrating a modified switch interlock arrangement.

FIGURES 21A and 21B illustrate a modification of the switch interlock arrangement of FIGURE 20. In FIGURE 21A the plug is in the intermediate position while in FIGURE 21B the plug is in final position.

FIGURE 22 is a fragmentary side elevation of a duct including the door over the access opening.

FIGURE 23 is a cross-section taken through line 23—23 of FIGURE 22 looking in the direction of arrows 23—23.

FIGURE 24 is a rear view of a plug especially constructed to be mounted to the duct of FIGURE 22.

FIGURE 25 is a load end view of the plug of FIGURE 24.

FIGURE 26 is a bottom view of the plug of FIGURE 24.

FIGURE 27 is a fragmentary perspective view illustrating the front of the plug of FIGURE 24 at the line end thereof.

FIGURE 28 is a plan view of the duct access door.

FIGURE 28A is a view showing the top edge of the door of FIGURE 28.

FIGURE 29 is a side view of the duct with the access door removed to show the shape of the access opening.

FIGURE 30 is a perspective view of the positioning door interlock key forming part of the plug of FIGURE 24.

It is to be understood that in the schematics of FIGURES 1A–21B portions of the duct and plug have been omitted when not essential to the particular feature under consideration. FIGURES 22–30 are detailed drawings illustrating a duct and plug incorporating the broad features of the instant invention.

It is also to be understood that reference to the front of the plug means the surface of the plug facing the duct; reference to the line side of the plug means the side of the plug case nearest the contact fingers, and reference to the load side of the plug means the side of the plug case furthest from the contact fingers since this is usually though not necessarily, the side of the case through which the load conductors extend.

*Temporary Support Means*

Now referring to the figures and more particularly to FIGURES 1A and 1B, a plug case 101 is shown self-supported in an intermediate position on a duct 102. The intermediate position can be described as one in which the plug contact fingers 107 have not yet entered the plug-in opening of the duct 102 while the term self-supported has reference to the fact that the plug is not supported by the installer or any special tool. A fixed hooking member 103 extends from the load end of the case 101 to engage a rail 104 on the top portion of duct 102. Flanges 105 extend from the top and bottom of the case 101 to rest against the flat portions 106 of the top and bottom of the duct 102. The hook 103 serves to support the plug vertically, while flanges 105 hold it horizontally in line with the duct 102. The plug 100 can be swung into position against the duct 102 so that fingers 107 enter plug-in openings 108. During this action, the plug 100 pivots about line 109.

A second method, shown in FIGURES 2A–2E, employs one top load end fixed hook 111 and one extended top line end fixed hook 113. Here fixed hook 111 is again located on the load end of plug 112. The longer hook 113 is attached to the line end of the plug 112. Both hooks 111, 113 are used to support the plug in its intermediate position. Vertical stability is obtained by resting edge 114 against the side of the duct 102. The plug 112 is swung into position by pivoting about edge 114. When this occurs, hook 113 rides over the top of the duct 102 as shown at 116. In this method, no flanges are required as in the previous method since the line hook 113 provides the necessary vertical stability.

A third method of self-support employs wings or side hooks (FIGURES 3A–3D) which enter slots 118 in the side of the duct enclosure 102. These slots 118 are just long enough to accommodate the base of the wing 117 as shown in the enlarged view, so as to limit longitudinal movement of the plug 100a when in final position on the duct 102. The tip of the wing 119 is elongated so that a hook locking action is obtained. A top flange 120 is also provided to obtain longitudinal stability and positioning for the plug 100a.

A fourth method, FIGURES 3E, 3F employ slots 121a or embossments 122a in the duct enclosure for cooperation with a top load end hook 123'. As shown in FIGURE 3E, the duct enclosure 121' contains a series of slots 121a into which a fixed top load end hook 123' can be engaged. A top flange 124' assists in horizontal stability of the plug 100'. Alternatively, embossments 122a can be placed along the inside vertical portions of the duct enclosure 122' as in FIGURE 3F.

A fifth method, FIGURES 4A–4D illustrates a two piece plug housing. A plug case 121 containing contact fingers, switch mechanism, etc. is pivoted at its load end at 122 to a second body or enclosure 123. This enclosure consists of a top flange 124, a bottom flange 125, and a tie member 126 at the line end forming an open ended box into which plug body 121 can fit. The top flange 124 is formed to provide a continuous hooking edge 127 along its length 128 for temporary support of the plug device on the duct 102. Alternatively individual hooks, as at 103 in FIGURE 1A, can be employed at both the line and load ends of the top flange 124. Stability of the plug in its temporary or intermediate position is provided by resting edge 129 of the plug body 121 against the side of the duct 102, by the edge 126a of tie member 126 against the side of the duct 102, by the top flange hook 127 over the top of the duct 102 and by resting the line end of the plug body 121 on the bottom flange 125.

In order to coordinate the relative movement of the two elements of a two piece plug to obtain better guiding, and to limit the outward position of the plug body, slots 130 are placed in the top and/or bottom flanges 124 and 125. Pins 131, permanently fixed to the plug body body 121, ride in these slots and provide guiding and stop positions.

To assist in installing the plug 121 in its temporary position, it is desirable to lock the plug body 121 to the enclosure, especially in the "open" position. This is done by biasing guiding pin into locking grooves at the ends of the slot in the flange. One means of accomplishing this is shown in FIGURES 4E–4F. Pin 132 is biased into groove extensions 133, representing the limits of the "open" and "closed" positions of the plug body 121. Unlocking consists of manually pushing the pin 132 into the main portion of the slot 130 and moving the plug 121 away from duct 102.

A sixth method for obtaining temporary positioning of a plug device is shown in FIGURES 5A–5C. A two piece unit is again used, except that the flange enclosure is replaced by a plate 134 slidably attached to the line end of plug body 135. This plate 134 contains a hook member 136 which, together with a stationary hook 137 at the load end of the plug body 135 provides the temporary support. Slots 138 in the end plate 134, and stationary pins 139 in the plug body 135 provide the guiding and limit stops for the relative motion and supporting between the end plate 134 and plug body 135. Spring biased pins and end grooves in the slots can be employed for "locking" purposes in the closed or open plug positions as described and shown in FIGURES 4E–4F.

In each of the six methods for temporary support previously described, it is to be noted that a common element exists that provides both a stability of support for the temporary positioning of the plug on the duct, and a point about which the plug is pivoted for rotation into its final or inserted position. This common element is the positioning of the load edge of the plug against the side of the duct, as at 109 in FIGURE 1A, 114 in FIGURE 2A, 118 in FIGURE 3A, etc. It is also to be noted that each of the six methods incorporate hooking means that engage the top of duct 102, the shape of which is merely an offset or ledge against which the hook can rest. These are the simplest arrangements for the more common duct installation condition where bus duct will be horizontally supported with plugs to be inserted into the sides of the duct.

There are two other duct installation conditions that are sometimes employed which may require additional elements on the plug device to achieve a self-supporting condition in its temporary position. The first is a horizontal run where plugs will be required to be installed to the underside of the duct. This is typified by the duct being placed against a ceiling with the plug-in areas facing downward. For this condition, a releasable hook 140a can be added to the load end of the plug 140 opposite a fixed hook 141 as shown in FIGURE 6. Such a hook is all that would be necessary for the temporary support methods of FIGURES 2A, 4A, and 5A where a stationary hook is also provided on the line side of the plug. A three point support is thus obtained. It is obvious that another releasable hook can be placed on the line side of the plug. Such an addition would provide better stability.

For the temporary support method of FIGURE 1A where a single load hook and flange combination is used, a bottom load end releasable hook and a plate extension from the load end of the plug could be employed. This is shown in FIGURE 7. Extension 142 bears against the side of the duct 102 when the plug 142a hangs down. This same type of extension can be used in the construction of FIGURE 3A.

The second type of duct installation condition that requires additional consideration for temporary self-support of the plugs has to do with riser applications where the duct is mounted vertically. With the support method of FIGURE 3A, vertical positioning of the plug is readily obtained by engagement of wings 117 into slots 118 in the side of the duct enclosure 102. A support extension from the load end of the plug, as by 142 in FIGURE 7, can be added to prevent the plug from swinging too far from the duct 102. Vertical support of other plug designs incorporating stationary and releasable hooking means, such as shown in FIGURES 1A, 2A, 4A and 5A, can be accomplished by providing slots or embossments in the duct case for engagement by the hooks of the plug. Two such slot areas were shown in FIGURES 3E–3F. Slots can be employed for ventilated bus duct, while embossments would be required for totally enclosed duct. The top line side hooks of FIGURES 2A, 4A and 5A assist in preventing the plug from swinging away from the duct. The design of FIGURE 1A will require a support extension from the load end of the plug, as at 142 in FIGURE 7 for the same reason as was necessary for the construction of FIGURE 3A.

*Final Fastening Means*

Having developed methods by which plugs can be placed in a temporary, intermediate, or "open" position, it was desirable to employ some of the elements of those methods to assist in securing the plug to the duct in its final or "closed" position by means that are rapid and positive. These means can be divided into those necessary to attach the load end of the plug and those necessary for the line end. Considering first the load end, it has been found that the simplest approach is to rely on the top fixed load end hook described previously, with no additional attachment screws. Since this hook has the correct dimension to envelop the support ledge or offset on the duct or the slots or embossments of the duct enclosure, the load end of the plug will reset fairly snug against the duct when the line end has swung into its final position.

With heavier plugs of higher capacities a more positive holding means is added at the bottom load end of the plug. This can be accomplished by including a releasable hook at the bottom load end as previously described in FIGURE 6. Alternatively a locking pressure screw 141a (FIGURE 8) can be employed threaded into a plug case flange member 141b. When the screw 141a is tightened, it can bear against the duct enclosure surface as shown in FIGURE 8B. Also it is possible to emboss and tap a portion of the flange 41C (FIGURE 8D) so that a screw 141d can bear against the corner 141e of the offset. Tightening of the screw will draw the plug against the duct. Further, it is also possible to provide a depression 141f (FIGURE 8B) on the duct against which a screw 141g on the flange of the plug can bear in pressure and locking relationship. The pressure screw arrangements described can be located at or near the load end of the plug.

Other methods for locking the load end of the plug incorporate different types of hooks. In the embodiment of FIGURE 9, a releasable hook 148 is made retractable and operable by a screw 149 in a bracket 150 on the load end plate of the plug. This screw enters a threaded end 151 of the hook and when tightened will draw the plug tight against the duct 102. Alternatively, the end plate 152 (FIGURE 10) is shaped with an extension 153 to bear against the duct enclosure 102 so that tightening screw 149 will transfer some of the clamping force to the stationary hook 154.

Still another means of obtaining clamping pressures on the load side of the plug is to place a spring member 155 (FIGURE 11) along the front of the plug 155a near the load side and to employ a bottom load end releasable hook as in FIGURE 6. When the plug 155a is moved to its final position, force will be provided by spring 155 to take up any looseness in the load hook members.

A further means of accomplishing the load end clamping function is to employ an extension 156 (FIGURE 12) from the end plate of the load end of the plug 156a that accommodates a screw 157 which can be turned against the side of the duct enclosure 102 so as to draw the hooks up tight. Extension 156 can be the same piece 142 as shown in FIGURE 7 for the temporary positioning of the plug in vertically installed duct. A top load fixed hook and a bottom load releasable hook are necessary in this construction.

Considering next the means for final support or fastening of the line end of the plug, as illustrated in FIGURE 13A, a flange 143 is placed on the line end of the plug 143a and accommodates at least one fastening screw 144 which can enter a mating threaded hole in the side of the duct 102. This same screw 144 can enter a hole or slot in the plug-in access door 145 to keep the door from closing when plug 143a is in position. Thus, no other locking or detent means is necessary for the open position of the door 145.

The two piece plug designs of FIGURES 4A and 5A can also employ a flange as part of the plug body so that the plug body itself is directly fastened to the duct. FIGURES 13C–13D illustrate one arrangement. The tie member 126 of FIGURE 4A is extended away from the line end as shown at 145a of FIGURE 13C. This makes room available for a flange 145b, attached to plug body 145c, to swing into position against the side of the duct 102 for fastening purposes. Similarly, the end plate 134 of FIGURE 5A can be made to be retractable inside the plug body 145e as shown in FIGURE 13E. The end plate 145d, retractable within the plug body 145e, makes it possible for a flange 145f to be attached to the outer line end of the plug for fastening purposes as previously described.

Another method for line end attachment is to use the pressure locking screw means of FIGURE 8D at or near the line side of the plug on a top flange or on a top and bottom flange.

A third method for line end attachment is to employ a releasable and retractable bottom line end hook as previously described with respect to FIGURE 9. This is adaptable directly to the plug designs of FIGURES 4A and 5A where a top fixed line hook is employed. Alternatively, the pressure point method of FIGURE 10 can be added so that increased clamping of the top fixed hook can be obtained.

A fifth method would include a releasable top line hook, particularly to the plug design of FIGURES 1A and 3A which, with a bottom releasable and retractable line hook, would perform an adequate line end clamping function. The pressure point method of FIGURE 10 can be added for increased clamping of the top line hook.

A sixth method would utilize the plate extension of FIGURE 12 attached to the line end for a pressure locking screw against the side of the duct. This screw can also engage a hole in the door so that the door may be prevented from being closed while the plug is attached to the duct. This method is applicable with top and bottom releasable line end hooks to plug designs of FIGURES 1 and 3, and to the two piece plug designs of FIGURES 4 and 5 having bottom releasable line end hooks.

Alignment With Plug-in Opening

Properly aligning the contact fingers of a plug to the plug-in opening is an important safety consideration since it is desirable to eliminate any possibility that the contact fingers will contact the bus bars and the edges of the plug-in opening at the same time. In the plug design of FIGURE 3A such alignment is automatically obtained by the prelocation of the slots in the duct enclosure to accept the side wings. For all other plug designs, FIGURES 1A 2A, 4A and 5A where hooks are employed on the load side of the plug, cooperating and prelocated slots serve for alignment purposes, such as those illustrated in FIGURES 3E–3F. It is to be noted that the cooperation of load end hooks and slots in the above general scheme occurs before the plug is pushed into its final position; hence, alignment is secured before the contact fingers enter the plug-in opening.

It is also possible to place an alignment finger 158, FIGURES 14A–14D, on the line end of plug 158a to cooperate with a notch 159 in the plug-in opening 157a of duct enclosure 159a. By coordinating the door 160 and plug-in opening notch 159, the contact finger 158 cannot extend into the opening 157a until the door 160 has been moved out of the way toward the left of the opening. Finger 158 also can be made to serve another function in that the door 160 canot be closed with plug 158a in its "closed" or inserted position. This prevents any possible short circuit between contact fingers 160' and the door edge while the contact fingers engage the bus bars. A further additional function of an alignment finger is that of engaging a door release spring (not shown).

A modification in the placement of an alignment finger is obtained by making the finger as part of the tie plate or end plate of the two-piece plug designs of FIGURES 4A and 5A. FIGURE 14E shows such a construction adapted to the end plate type of plug of FIGURE 5A. An extension 160a is made part of the end plate 160b and acts as a finger to enter a slot in the duct enclosure. The advantage of this method is that no further entrance of the finger into the duct occurs as the plug 160c is pushed into an inserted position. This is to be contrasted with the previously described construction where the locating finger is made part of plug body 160c and must enter the duct enclosure when the plug is pushed against the duct. To avoid this latter condition, however, it is possible to construct the finger so as to be spring biased and retractable within the plug body.

Door Interlocks

The alignment finger referred to above can also serve as a key which cooperates with the door for two purposes; the door must be closed before the key is inserted and the door must be closed before the plug can be removed from the duct. These actions are very desirable in that a substantially dead-front aspect is obtained by the door alone, regardless of the insulated or non-insulated nature of the bus bars around the plug-in areas and exposure of the bus bars is kept to an absolute minimum during installation of plugs.

FIGURES 15A–15C illustrate one simple method for a door interlock design in which an L-shaped finger 161 is rigidly attached to the line end of the plug body 161a. Finger 161 is preferably made longer than the length of the contact fingers 162 so that these fingers will not interfere with the door while the key finger 161 performs its function. A slot or opening 163 is placed in the duct enclosure 163a adjacent to the door 164 and the plug-in opening 165. Door 164 preferably includes an inwardly bent portion 166 which engages each edge 167 and 168 of plug-in opening 165, thus providing limited motion of door 164 in its open and closed positions. Opening 163 in the duct enclosure 163a is not blocked when the door 164 is closed, hence, the L-shaped key finger 161 can enter this opening 163. Opening 163, however, is partially blocked when door 164 is open, and key finger 161 cannot enter opening 163 under this condition. Thus, door 164 must be closed as a first sequence in inserting the plug 161a. Once key finger 161 has entered opening 163, door 164 can be moved into a full open position, after which plug 161a can be pushed into its full inserted or "closed" position. In removing plug 161a, its outward motion is restricted by engagement of the upright portion 169 of key finger 161 against door 164. Thus, door 164 must then be closed if plug 161a is to be totally removed from the duct 163a.

While the interlock method described above is very simple, it is often desirable to improve its action to take into account two possible deficiencies. During the insertion of key member 161 into opening 163, it is possible to jam contact fingers 162 against door 164. Also, with the plug 161a inserted, it is possible to move door 164 toward its closed position so as to make electrical engagement with contact fingers 162 and to cause a short circuit to ground. While it would be possible to insulate the fingers 162 or to employ a second interference finger for engagement with door 164 to prevent the door from being closed and to prevent full insertion of plug 161a with door 164 closed, it is more practical to construct the key finger of a Z-shape for these added functions. Such a construction is shown in FIGURES 16A–16G.

A Z-shaped interlock finger 170 is rigidly attached to the line end of a plug body. Finger 170 is made to cooperate with slots in door 171 and plug-in opening 172 in contrast to the previous method where the L-shaped finger was made to cooperate with an opening in the enclosure only. Slot 179 in door 171 is also of a general Z-shape, for cooperation with finger 170, and covers plug-in opening 172. This plug-in opening 172 includes a lower notch 172a for purposes later explained. When door 171 is closed and in position over plug-in opening, a slot 173 exists for acceptance of the forward end 174 of the interlock finger 170. Edge 175 abuts against portion 176 of door 171 to prevent further entrance of finger 170 and effectively serves to prevent jamming of contact fingers 177 against door 171. This partial insertion of interlock finger 170 constitutes the first in a sequence of operations.

The second sequence in the operation is to slide door 171 to its open position. During this action, the narrow portion 178 of interlock finger 170 rides in the narrow portion 179 of the Z-shaped slot in door 171. Hence, while door 171 is in a position other than fully closed or fully open, the plug is locked against either further insertion, or removal. When door 171 is fully open, the third operation is to push the plug into its "closed" or inserted position. This is now possible since key 170 can now enter into portion 180 of the Z-slot of cover 171. Notch 172a of the plug-in opening 172 is of the same shape as the Z portion 180 and permits the Z-shaped interlock finger 170 to slide past into the duct enclosure 170a.

Once the plug has been started in its travel toward its fully inserted position, door 171 cannot be closed. This is prevented by cooperative engagement between edge 181 of door slot 179, and side 182 of the interlock finger 170. Thus, danger of premature closing of door 171 before the contact fingers have been retracted is eliminated. Engagement of the opposite edge 183 of the door slot 179 against the opposite side 182 of interlock finger 170 also provides an automatic stop of door 171 against motion beyond its full open position. A stop for door 171 in its closed position can be incorporated similar to that shown in FIGURE 15A in which a bent portion 166 engages edge 168 of the plug-in opening.

Retraction of the plug is accomplished in a similar manner to the insertion sequence. When this occurs, tip 184 of interlock key 170 engages portion 185 of door 171 while the door is in the open position. This action prevents complete removal of the plug unless door 171 is first closed, at which time the tip 174 of the interlock finger 170 can be slid past opening 173 of door 171.

The Z-type of interlock finger basically adds an additional stop for cooperation with the door to overcome the two deficiencies enumerated previously with respect to the L-type finger as described in connection with figures 15A–15C. However, both of these methods employ a rigid finger attached to the line side of the plug body which must enter the duct enclosure when the plug is pushed into its inserted or final mounting position. There are some duct designs which cannot tolerate the full insertion of a long metallic finger by reason of close spacings, uninsulated bars, a narrow duct, etc. In such cases, the interlock finger is stopped from full insertion by the duct enclosure by a bracket 163g (FIGURE 15A). After the door is opened, the plug is inserted into the duct and the finger, being spring loaded, retracts into the plug. A similar arrangement with the Z finger of FIGURE 16A can also include a spring biasing means, in which edge 175 of the finger abuts against a filled-in portion of the door previously indicated as 180. In both of these schemes, however, it is still possible to close the door prematurely against the fingers. This restriction in safe operation is eliminated by employing a releasable pin 186 in a slot 187 in the interlock finger 187a as shown in FIGURES 17A–17C. With finger 187a extended, pin 186, spring-biased and part of the plug enclosure, is confined in an upturned portion 187b of the slot 187. This locks the finger 187a. After the sequence of operations as described with respect to FIGURE 16A is performed, pin 186 is pushed downward and interlock finger 187a can be retracted along the side of the plug against spring 188. Entrance of interlock finger 187a into the duct is prevented by abutment of edge 189 of the finger against side 190 of the door. As another construction, it is possible to incorporate a rigid interlock finger as part of the flange enclosure or the end plate of the two piece plug device shown in FIGURES 4A and 5A respectively. In these cases, the finger is stationary and does not move when the plug body is pushed against the duct. Its function then becomes one similar to the L-shaped finger described with respect to FIGURES 15A where it acts in conjunction with the duct enclosure, or it can be similar to the forward portion of the Z-shaped finger of FIGURE 16A acting in conjunction with slots 173 and 179 of the door.

There are instances where it would be desirable to have the interlock finger retractable and locked in the plug. Such cases exist where the interlock to the door may want to be voidable as for inspection, or where the same plug having an interlock finger would be placed on a different duct design having no interlock type of door. In these events, the finger can be arranged to be either partially or completely retractable within the plug with a screw for locking purposes. Alternatively and in combination, the door can be arranged with a screw acting as a stop member in place of the bent over tab, such as shown at 166 in FIGURE 15A. The screw is removable so that the door can slide past its normal open position, thus allowing freedom for the interlock finger to move unrestricted into and out of the duct without interference by the door. In this instance, that portion of the door defined by edge 183 in FIGURE 16B can be slotted so that there will be no interference with the side opposite 182 of the key. Naturally, the screw can be made to abut the open edge of the plug-in opening to serve as a normal door open position stop.

All of the above methods for engagement of a finger from the plug with slots in a plug-in door for interlock purposes are, of course, adaptable to any type of plug, irrespective of any temporary holding means. It is obvious, however, that a means for temporary support of the plug will make operation of the interlock simpler and more practical since the installer is free of the weight of the plug.

Switch Interlocks

Switch interlocks between plugs and the duct enclosure are necessary from a safety standpoint since they prevent contact finger engagement or disengagement from the bus bars while the switching contacts within the plug are in an On position. FIGURES 18A–18C illustrate one method for accomplishing such a function. The plug body 192a of FIGURE 18A incorporates a molded case circuit breaker 193 as one form of switching device. A U-shaped bracket 194 is pivotally attached to the sides of the plug enclosure 192a at 195 and extends around the top of the circuit breaker 193 so as to be operatively connected to the breaker handle 196. Hence, operating the breaker handle 196 will also swing the bracket 194 about its pivot points 195. An interlock lever 197 is pivotally attached to one side of the plug enclosure at 198. Connecting the interlock lever 197 and the U-shaped bracket 194 is another member 199 whose function is to rotate the interlock lever 197 when handle 196 of the circuit breaker 193 is moved. A slot 200 exists in duct casing 192g which is just wide enough to receive the forward end 201 of the interlock lever 197. When the plug device is turned to an On position, the interlock finger 197 is rotated so that a notch portion 202 engages end portion 203 of the slot in the duct enclosure 192g.

It can be seen that with such an interference, the plug device cannot be removed while it is in an On position. Also, it is obvious that the plug cannot be inserted into the duct while in an On position since tip 202 of the interlock finger 197 will abut edge 203 of the slot.

While the slot for receiving the switch interlock finger has been described as being in the duct casing, it is functionally superior to arrange the plug-in access door to cover the slot when in the closed position, and to provide that the door must be fully opened before the switch interlock finger can enter its slot. Two improvements are provided. First, the contact fingers cannot engage the bars unless the door is fully open. Second, the door cannot be closed until the switch interlock finger has been retracted. FIGURES 19A–19C illustrate this basic arrangement. The mechanism of FIGURE 18A has been reversed so that the switch interlock finger 204 swings to the left when the plug device is turned On. The view showing the door positions illustrates the area where the interlock finger will enter the plug-in opening. It is obvious that the door must be fully opened in the direction to the left before the interlock finger can enter the plug-in opening. Turning the plug to the On position will cause the finger to move to the left and to hook under the ledge of the plug-in opening at 205. It is also obvious that any attempt to close the door with the finger inserted will be unsuccessful, whether the finger is hooked or not. Incidentally, it should also be obvious that the desirable direction for door motion is to the left, away from the plug.

In order that the interlock mechanism is always effective, a fixed member from the plug must coordinate with a fixed slot in the duct enclosure. This is necessary so that the plug cannot be shifted longitudinally along the duct so as to allow interlock lever 197 to enter slot 200 while the load break switch is in an On position. Several combinations are possible among them a fixed member can be an additional finger, of the type described as a door alignment finger 158 in FIGURE 14A, and locates the plug with respect to the duct prior to the entrance of the switch interlock finger.

A second combination makes use of the prepositioning methods of the plug on the duct to coordinate or align the switch interlock finger. These methods, previously described, make use of side wings engaging slots in the duct casing (FIGURE 3A) or with slots or embossments on the duct casing to accept top load hooks. These plug alignment arrangements take the place of the previously described door alignment finger of the plug for proper coordination of the switch interlock finger with its interlocking slot in the duct casing. They add, however, the function of temporary support and the ability of pivoting or swinging the plug into position.

For those plug arrangements not employing the interaction of plug load end hooks into slots in the case, the door interlock fingers previously discussed can be used for pre-positioning prior to engagement of the switch interlock finger. Naturally, these door interlock fingers must be longer than the switch interlock finger for proper coordination. For the L-shaped finger of FIGURE 15A which does not restrict inward movement of the plug with the door in any position, it is desirable to locate the switch interlock finger to the left of the door as shown in FIGURE 19A. With the Z-shaped finger whose added function dictates that the door must be fully opened before the plug can be fully inserted, the switch interlock finger can be located either to the left or to the right of the door, as in FIGURES 18A or 19A. This provides a freedom of design for the switch mechanism.

A third means for a switch interlock is obtained by having the switch interlock lever act directly on the door interlock. In FIGURE 20, a door interlock finger of a type previously disclosed in FIGURE 16A is pivoted at 205 to the plug housing. Lever 206 is pivotably attached to the interlock finger at 207 and acts to rotate the interlock finger by the switch mechanism in the same manner as described in FIGURE 18A. If the switch is On, the door interlock finger is rotated in a position such that it interferes with a slot in the duct enclosure or door, thus preventing the plug from being inserted. Conversely, with the plug in position on the duct and with the switch On, the plug cannot be removed since a notch 208 is engaging the edge of a slot or opening in the duct enclosure or door. Turning the switch Off will rotate the door interlock finger, and the plug can be pulled out of engagement with the duct.

For the condition of the spring biased door interlock finger of FIGURE 17A, two sets of notches can be provided for engagement with a swinging lever operated by the switch mechanism. FIGURE 21A illustrates such a construction. If the plug is retracted and is being pushed into the duct, and the switch mechanism is in the On position, the lever 209, operated by the switch mechanism, is in engagement with notch 210 of the finger. At the same time, edge 211 of the interlock finger is against the edge of the door in a manner previously described in FIGURE 18A. These two interferences prevent plug insertion. If lever 209 is out of engagement with slot 210, as when the switch is Off, the plug can be inserted normally. Conversely, when the plug is to be removed and the switch is On, the lever 209 is in engagement with another slot 212 in the finger. Since edge 213 of the finger is acting against the edge of the door, the plug cannot be withdrawn. Only when the lever 209 is out of the slot 212, as by turning the switch Off, can the plug be withdrawn.

Interlocks with the switching mechanism can also be made to cooperate with the closing means of the two piece type of plug device, as with the movable flange and movable plate types of FIGURES 4A and 5A respectively. In respect to these two plug constructions, FIGURE 4E illustrates a movable pin 132 that is spring biased into groove extensions 133 so as to "lock" the plug body 121 to the flange member in the "open" and "closed" position. This pin is part of and spring biased with respect to the plug body. For switch interlock purposes, a lever from the switch mechanism can be made to interact with the pin so that the pin cannot move or be unlocked when the switch is On. Effectively then, the plug body cannot be pushed into a "closed" position or retracted into an "open" position unless the switch is in an Off position.

Where locking pins are not employed, an effective interlock for switching purposes is obtained by allowing the lever actuated by the switch mechanism to engage two sets of slots in the end plate 134 of FIGURE 5A or the tie plate 126 of FIGURE 4A in a manner similar to that described with the action of the lever in notches of the door interlock finger of FIGURE 21A. These slots accept the lever when the switch is turned On and prevent the plug body from being inserted or withdrawn.

Now referring more particularly to FIGURES 22–27, bus duct 300 is substantially of the type described in detail in copending application, Serial No. 815,562, filed May 25, 1959, entitled "Plug-In Section for Bus Duct," and assigned to the assignee of the instant invention. Bus duct 300 comprises an elongated housing 301 constructed of two side channels 302, 303, a top channel 304 and a bottom channel 305 all secured together by screw means 306. The side channels 302, 303 are formed inwardly at 307. These inwardly formed portions are overlapped by the extending ends 308 of top and bottom channels 304, 305 to form grooves or tracks within which door 310 is guided for sliding movement.

Door 310 is adapted to cover access opening 311 in side channel 303 of housing 301. Inwardly extending door tab 399 establishes the limits of travel for door 310 while spring 398, secured by rivet 397 to the inner surface 377 of door 310, bears against the outside of channel 303 to prevent accidental movement of door 310.

Channel members 312, 313, disposed within housing 301 and secured to side channels 302, 303, respectively, maintain insulating spacer blocks (not shown) in operative position. These blocks in turn maintain bus bars 314—317 in operative relationship extending parallel to the longitudinal axis of duct 300. As described in the aforesaid copending application, Serial No. 815,562, each of the bus bars 314—317 is comprised of two laminates with each pair of laminate being encased by a thin insulating covering.

Plug 320 is of the type described in U.S. Patent 2,861,139 and comprises an elongated case 321 having cover 322 pivoted at the load end of case 321 on hinges 323. A three pole molded case circuit breaker 325 disposed within case 321 serves as a load break switch. This type of circuit breaker is described in detail in U.S. Patent 2,673,908. The line terminals of circuit breaker 325 are connected in electrical series with contact fingers 326—328 which project beyond the confines of case 321 at the front side 320 thereof.

Neutral strap 331 disposed within case 321 is connected in electrical series with the fourth contact finger 329. Load connections are made to the load terminals of circuit breaker 325 as well as terminal 332 of neutral bar 331 by means of a cable (not shown) extending through one or more of case knockouts 333. Contact fingers 326—329 are maintained in staggered operative position and insulated from each other by molded insulating block 335.

The temporary fastening means is of the type illustrated in FIGURE 1A and comprises a hook 336, projecting forwardly of housing 321 and secured thereto at the door load end thereof. Top flange 337 and bottom flange 338 engage the top 339 and the bottom 340 bulging formations of duct housing 301 to provide stability for plug 320 when plug 320 is maintained in its intermediate position. The line end of bottom flange 338 is provided with portion 395 which extends more forwardly than contact fingers 326—329 for protection of fingers 326—329 during transit.

Final fastening is achieved by screw 342 which is captured to flange 333 at the line end of case 321. Final fastening screws 342 are adapted to pass through door clearance holes 344' and be received by threaded aperture 344 in side channel 303 when door 310 is fully opened and plug 320 is moved to the final position. Screw 346, threaded in block 347 secured to the bottom flange 338 of case 321, is positioned so as to bear against surface 348 of bottom channel 305 thereby taking up any slack between plug 320 and duct 300. An external operating handle 349 for manual operation of load break switch cover 325 is pivotally mounted at 350 to the external side of cover 322. Cover mounted mechanism 351 is disposed on the internal side of cover 322 and is operatively connected to handle 349 so as to be rotatable in unison therewith when cover 322 is closed as cover mounted mechanism 351 engages switch interlock mechanism 352.

Switch interlock 352 is of the type illustrated in FIGURES 18A–18C and comprises a U-shaped strap 353 which is pivoted to the top and bottom of case 321 by rivets 354. Starp 353 extends over the top of load break switch 325 and is provided with an opening 355 in the web thereof. Circuit breaker operating handle 365 is disposed within opening 355 so that pivoting of stray 353 about rivets 354 results in a reciprocation of circuit breaker handle 356 for manual operation of the circuit breaker 325. The cover mounted mechanism 351 engages upwardly extending portions 357 of bracket 358 mounted to the web 353 of strap 352 and in this way movement of handle 349 effects operation of load break switch 325.

Switch interlock finger 360 is pivotally mounted to the top of case 321 by rivet 361. Link 362 is secured by rivet 363 to interlock arm 360 and by rivet 364 to the lower end of one of the arms of strap 352. Thus, a clockwise movement (with respect to FIGURE 26) of strap 352 about its pivots 354 causes a clockwise movement of switch interlock link 360 about its pivot 361. The cooperation of switch interlock link 360 and duct 300 will be hereinafter explained. Positioning and door interlock key 366 extend forwardly of case 321 and is disposed at the bottom line end thereof. Key 366 (FIGURE 30) is constructed of sheet material and comprises a vertically positioned forwardly extending portion 367 and a horizontally positioned portion 368 extending along the top edge of portion 367. At the forward end of horizontal portion 368 notch 369 is formed in portion 367. Forwardly of notch 369 portion 367 is provided with an upstanding tip 370 extending above horizontal portion 368.

In order to cooperate with key 366, access door 310 (FIGURE 28) is provided with notches 371, 372 which communicate with the bottom edge thereof. Notch 371 is elongated and vertically positioned near the left hand end of door 310 while notch 372 is elongated and horizontally positioned in the extension 373 at the lower right hand corner of door 310. Also cooperating with key 366 is an inverted L-shaped notch 374 which communicates with the access opening 311 (FIGURE 20) of duct 300 at the lower left hand side thereof.

When door 310 is closed, an elongated vertical opening comprised of notch 371 and the vertical portion of notch 374 is presented to key 366. Thus, key 366 may enter duct housing 301 until the forward edge 375 of the key horizontal portion 368 engages door 310. Thereafter door 310 may be moved to the left for opening thereof. During the opening of door 310 the portion thereof between notches 371, 372 rides in notch 379 of key 366. During the opening movement of door 310 the upstanding forward end 370 of key 366 cannot be withdraw from duct housing 301 since the rear edge 376 of upstanding portion 370 will engage the inner surface 377 of door 310.

When door 310 reaches the fully opened position its horizontal notch 372 will be aligned with the horizontal portion of duct notch 374. At this time the entire notch 374 is accessible and presents an opening which is the same shape as the composite horizontal 368 and vertical 367 portions of key 366. Thus, key 366 may be entered into duct housing 301.

Final fastening screws 342, 356 may then be operated so as to secure plug 320 in final position with respect to duct 300. Screws 342 then extend through door clearance openings 344' so that door 310 cannot be closed.

Access opening 311 is provided with another notched portion 379 near the upper right hand corner thereof which cooperates with switch interlock finger 360 to prevent load current switching from taking place between contact fingers 326–329 and bus bars 314–317. This is achieved by providing switch interlock finger 360 with a notch 380 in the inwardly offset forward free end thereof. When plug 320 is mounted to duct 300 and switch 325 is in its Off position, interlock finger 360 is in its most counterclockwise position so that notch 380 is moved to the right with respect to FIGURE 26 and the right hand portion 381 of the duct portion forming notch 379 is disposed within interlock finger notch 380. This cooperation between interlock finger notch 380 and duct portion 381 prevents movement of plug 320 from its final mounting position to its intermediate mounting position while load switch 325 is in the On position.

Similarly, should load switch 325 be in the On position while plug 320 is in the intermediate position movement of plug 320 to the final position is prevented by the engagement between the forwardly extending free end of interlock finger 360 and contact portion 381. When switch 325 is in its Off position interlock finger 360 is in its most clockwise position with respect to FIGURE 26 and in this position it may freely pass through duct notch 379.

Plug 320 is mounted to duct 300 by positioning temporary fastening hook 336 so that it engages the bulging portion 339 of duct housing 301. This establishes an intermediate mounting position for plug 320.

Plug 320 is then moved longitudinally along housing 301 until door interlock key 366 is aligned with duct notch 374. With the access door 310 closed plug 320 is pivoted about an axis defined by hook 336 until the forward upstanding end 370 of key 366 has entered duct housing 301.

Door 310 is then moved to the left to opening position moving through key notch 369. When door 310 is fully open plug 320 is pivoted about the axis defined by hook 366 to final mounting position wherein the front surface 330 of plug 320 is substantially parallel to the longitudinal axis of housing 301. It is noted that if load break switch 325 is On switch interlock arm 360 is positioned to the right so as to be misaligned with respect to switch interlock notch 379 thereby preventing movement of plug 320 from intermediate to final position.

With the movement of plug 320 from intermediate to final position plug contact fingers 326—329 enter pockets 389 of bus bars 314–317 engaging the bus bars 314–317 to establish electrical contact therewith.

Final fastening screws 342 at the line end are entered into threaded housing apertures 344 and load end final fastening means screw 346 is extended into engagement with housing portion 348. External handle 349 may then be operated to effect load switching through the operation of load break switch 325.

It is noted that the language of many of the claims is to be interpreted with reference to a horizontal bus duct run having a plug mounted to a vertical wall of the duct housing. While the claims are to be so interpreted it is noted that the construction is often equally applicable to vertical bus duct runs and to plugs mounted thereto as well as to plugs mounted to the underside of horizontal bus duct runs. Further, the reference in the claims to an enclosed electric distribution duct is not to be limited to totally enclosed ducts but is intended to include ventilated ducts.

Although we have here described preferred embodiments of our novel invention, many variations and modifications will now be apparent to those skilled in the art, and we therefore prefer to be limited, not by the specific disclosure herein, but only by the appending claims.

We claim:

1. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means defining an axis about which said plug is pivotable between said intermediate and final mounting positions; said first means comprising a hook-like member projecting from said case near a first end thereof.

2. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means defining an axis about which said plug is pivotable between said intermediate and final mounting positions; said first means comprising a hook-like member projecting from said case near a first end thereof; said first means also comprising flange means extending forwardly of said case.

3. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means including a hook-shaped member projecting therefrom and adapted to engage a cooperating formation of a duct housing and thereby support said plug in an intermediate mounting position; said first means projecting from said case near a first end thereof; second means comprising a member projecting forwardly of said case near a second end thereof and adapted to engage a formation of said duct housing for positioning said plug at a predetermined position along the length of said duct.

4. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means projecting from said case near a first end thereof; second means comprising a member projecting forwardly of said case near a second end thereof and adapted to engage a formation of said duct housing for positioning said plug at a predetermined position along the length of said duct; said second means comprising a key finger constructed to cooperate with suitable duct formation whereby a duct access door cannot be shut while said plug is in final mounting position and said contact fingers cannot enter said duct housing unless opening of the duct access door has taken place while said plug is in said intermediate mounting position.

5. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means projecting from said case near a first end thereof; second means comprising a member projecting forwardly of said case near a second end thereof and adapted to engage a formation of said duct housing for positioning said plug at a predetermined position along the length of said duct; said second means comprising a key finger constructed to cooperate with suitable duct formation whereby a duct access door cannot be shut while said plug is in final mounting position and said contact fingers cannot enter said duct housing unless opening of the duct access door has taken place while said plug is in said intermediate mounting position; said key finger including an extending first portion at the free end thereof, a first notch to the rear of said first portion, and a second portion to the rear of said first notch extending transverse to said first portion; said key finger first portion being constructed to be entered into the housing of a cooperating duct only while its access door is closed with the access door thereafter being openable by moving through said first notch and said second portion being constructed to thereafter be entered into the duct housing; said first portion when disposed within the duct housing establishing the intermediate mounting position; said second portion when disposed within said duct establishing said final mounting position.

6. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; a plate extension secured to said case by pin and cooperating guide slot means; said guide slot means defining limits of movement for said case between said final and intermediate mounting positions; said plate extension having means for releasable securement to a duct housing.

7. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; a plate extension secured to said case by pin and cooperating guide slot means; said guide slot means defining limits of movement for said case between said final and intermediate mounting positions; said plate extension having means for releasable securement to a duct housing; said first means being positioned near a first end of said case; said contact fingers and said plate extension being positioned near a second end of said case.

8. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; a plate extension secured to said case by pin and cooperating guide slot means; said guide slot means defining limits of movement for said case between said final and intermediate mounting positions; said guide slot means having offset end portions; biasing means urging said pin into said end portions whereby said end portions act as stops for said plug in said intermediate and final mounting positions.

9. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means defining an axis about which said plug is pivotable between said intermediate and final mounting positions; said first means comprising a first hook-like member fixedly secured to said case and projecting therefrom near a first end thereof; said first means also comprising a second hook-like member movably secured to said case and positioned to cooperate with said first hook-like member to define said axis.

10. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means defining an axis about which said plug is pivotable between said intermediate and final mounting positions; said first means comprising a first hook-like member fixedly secured to said case and projecting therefrom near a first end thereof; said first means also comprising a second hook-like member movably secured to said case and positioned to cooperate with said first hook-like member to define said axis; biasing means urging said second hook-like member toward engagement with a duct housing formation.

11. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means defining an axis about which said plug is pivotable between said intermediate and final mounting positions; said first means comprising a first hook-like member fixedly secured to said case projecting therefrom near the top of a first end thereof; a second hook-like member secured to said case near the top of a second end thereof; said second hook-like member extending from said case beyond said first hook-like member; said second hook-like member being constructed and adapted to establish said intermediate mounting position.

12. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; biasing means urging said plug away from a duct when said plug is in final mounting position to thereby compensate for an otherwise loose fit between said plug and a duct to which it is mounted.

13. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means projecting from said case near a first end thereof; second means comprising a member projecting forwardly of said case near a second end thereof and adapted to engage a formation of said duct housing for positioning said plug at a predetermined position along the length of said duct; biasing means urging said second means forwardly; said second means being mounted to said case so as to move rearwardly to a retracted position as said plug is moved from said intermediate to said final mounting position.

14. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means projecting from said case near a first end thereof; second means comprising a member projecting forwardly of said case near a second end thereof and adapted to engage a formation of said duct housing for positioning said plug at a predetermined position along the length of said duct; biasing means urging said second means forwardly; said second means being mounted to said case so as to move rearwardly to a retracted position as said plug is moved from said intermediate to said final mounting position; voiding means secured to said case and selectively engageable with said second means for maintaining said second means in said retracted position when said plug is in said intermediate mounting position.

15. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means defining an axis about which said plug is pivotable between said intermediate and final mounting positions; said first means comprising a hook-like member extending forwardly of said case near a first end thereof whereby a second end thereof is movable toward and away from a duct; means extending from said case first end in a direction away from said second end; said last recited means being constructed and positioned to engage a duct and thereby limit the movement of said second end away from said duct.

16. A plug for tapping power from an enclosed electric distribution duct; said plug comprising a case, a plurality of contact fingers mounted to said case in insulating relationship and positioned to operatively engage the bus bars of a duct when said plug is mounted to a duct in final mounting position; said case having a first means projecting therefrom and adapted to engage a cooperating formation of a duct housing and thereby support said plug in an intermediate mounting position; said first means defining an axis about which said plug is pivotable between said intermediate and final mounting positions; said first means comprising a first hook-like member fixedly secured to said case and projecting forwardly therefrom near a first end thereof; said first means also comprising a second hook-like member movably secured to said case, by pin and cooperating slot means, and positioned to cooperate with said first hook-like member to define said axis; biasing means urging said second hook-like member toward engagement with a duct housing formation; and locking means for maintaining said second hook-like member firmly engaged with said last recited housing formation.

References Cited in the file of this patent

UNITED STATES PATENTS

| | | |
|---|---|---|
| 2,173,062 | Hammerly | Sept. 12, 1939 |
| 2,590,522 | Dyer et al. | Mar. 25, 1952 |